United States Patent
Fittkau et al.

(10) Patent No.: US 6,948,504 B2
(45) Date of Patent: Sep. 27, 2005

(54) OZONATED WATER FLOW AND CONCENTRATION CONTROL METHOD

(75) Inventors: Jens Fittkau, Berlin (DE); Johannes Seiwert, Berlin (DE); Christiane Gottschalk, Berlin (DE)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/938,455

(22) Filed: Sep. 10, 2004

(65) Prior Publication Data

US 2005/0029202 A1 Feb. 10, 2005

Related U.S. Application Data

(60) Division of application No. 10/133,237, filed on Apr. 26, 2002, now Pat. No. 6,805,791, which is a continuation-in-part of application No. 09/653,506, filed on Sep. 1, 2000, now abandoned.

(51) Int. Cl.[7] .............................................. B08B 3/04
(52) U.S. Cl. ........................ 134/1.3; 134/26; 134/902; 210/752; 210/760
(58) Field of Search .............................. 134/1.3, 2, 26, 134/902; 210/739, 752, 760; 438/745

(56) References Cited

U.S. PATENT DOCUMENTS

| | | | |
|---|---|---|---|
| 3,286,992 A | 11/1966 | Armeniades et al. | 259/4 |
| 3,425,810 A | 2/1969 | Scott | 23/289 |
| 4,749,640 A | 6/1988 | Tremont et al. | 430/314 |
| 5,776,296 A | 7/1998 | Matthews | 156/345 |
| 5,776,342 A | 7/1998 | Hiranaga et al. | 210/442 |
| 5,971,368 A | 10/1999 | Nelson et al. | 261/64.3 |
| 6,017,827 A * | 1/2000 | Morgan et al. | 438/745 |
| 6,027,642 A | 2/2000 | Prince et al. | 210/180 |
| 6,080,531 A | 6/2000 | Carter et al. | 430/329 |
| 6,146,524 A | 11/2000 | Story | 210/199 |
| 6,398,928 B1 | 6/2002 | Koganezawa et al. | 204/262 |
| 6,431,183 B1 * | 8/2002 | Konishi et al. | 134/1.3 |
| 6,579,446 B1 | 6/2003 | Teran et al. | 210/85 |
| 6,585,898 B1 | 7/2003 | Ekberg et al. | 210/760 |
| 6,786,976 B1 * | 9/2004 | Gottschalk et al. | 134/10 |

FOREIGN PATENT DOCUMENTS

JP      11 009669 A      4/1999

OTHER PUBLICATIONS

International Search Report for International Patent Application No. PCT/US03/12973, dated Apr. 25, 2003, 10 pages.

* cited by examiner

Primary Examiner—Peter A. Hruskoci
(74) Attorney, Agent, or Firm—Proskauer Rose LLP

(57) ABSTRACT

The invention features an apparatus and a method for supplying ozonated water to more than one process tool. Ozonated water of a first concentration received from an ozonated water generator and water received from a source are mixed to produce ozonated water of a second concentration. The ozonated water of a second concentration is supplied to a first process tool. Ozonated water from the ozonated water generator is supplied to a second process tool while supplying the ozonated water of the second concentration to the first process tool.

10 Claims, 17 Drawing Sheets

OZONATED WATER FLOW AND CONCENTRATION CONTROL METHOD

CROSS-REFERENCE TO RELATED APPLICATION

The present application is a divisional of U.S. patent applicaction Ser. No. 10/133,237, filed Apr. 26, 2002, now U.S. Pat. No. 6,805,791 which is a continuation-in-part of U.S. patent application Ser. No. 09/653,506, filed Sep. 1, 2000, now abandoned, the entire disclosures of which are incorporated herein by reference.

TECHNICAL FIELD

The invention relates generally to manufacturing of semiconductor devices and more particularly to the control of ozonated deionized water supplied to semiconductor processing tools.

BACKGROUND OF THE INVENTION

Use of ozonated deionized water in semiconductor manufacturing can provide relatively simple, safe processing steps, such as wafer surface cleaning, passivation, native oxide removal, and removal of photoresist.

Ozonated deionized water generators generally produced ozonated water through use of contactors that permit diffusion of ozone from a gas into deionized water. Membrane contactors use an ozone permeable membrane to provide physical separation between liquid and gas, while packed column contactors provide intimate mixing of liquid and gas, under pressure to enable higher ozone concentrations.

A semiconductor fabrication facility often has multiple tools that require ozonated water. Different tools can require different ozone concentrations and flow rates. The purchase, operation and maintenance of multiple ozonated water generators can increase manufacturing costs and line shutdowns.

It would be beneficial to have a less expensive, more reliable, more flexible and more rapidly responsive ozonated water source.

SUMMARY OF THE INVENTION

The present invention relates to an ozonated water control unit for use in an improved ozonated water supply system. The control unit can modify the flow rate and/or concentration of ozonated water received from an ozonated water generator, for subsequent delivery to a process tool. One or more control units can be used with a single generator to supply more than one tool with individualized ozonated water needs.

In various embodiments, the ozonated water supply system can simultaneously supply ozonated water of different ozone concentrations to different process tools, even if the system includes only one ozonated water generator. Use of one or more control units with as few as one ozonated water generator permits independent control of ozonated water supplied to two or more process tools.

Each control unit controls its output flow rate and/or concentration of ozonated water. Thus, the parameters of the supplied ozonated water can be tailored for each process tool. In one embodiment, the system can supply low ozone concentration ozonated deionized water, for example, for a cleaning process, and simultaneously supply higher ozone concentration ozonated deionized water, for example, for a stripping process.

Thus, in a first aspect, the invention features a method of supplying ozonated water to more than one process tool. Ozonated water of a first concentration received from an ozonated water generator and water received from a source are mixed to produce ozonated water of a second concentration. Ozonated water of the second concentration is supplied to a first process tool, and ozonated water from the ozonated water generator is supplied to a second process tool.

In a second aspect, the invention features another method of supplying ozonated water to more than one process tool. The method includes providing an ozonated water control unit. The ozonated water control unit includes an ozonated water input line for receiving ozonated water of a first concentration from an ozonated water generator and a water input line for receiving water from a source. The unit also includes an ozonated water output line in fluid communication with the ozonated water input line and the water input line. A valve controls a flow rate of water in the water input line to produce ozonated water of a second concentration in the output line, in cooperation with a flow rate of ozonated water in the ozonated water input line.

The method further includes supplying ozonated water of the second concentration from the output line to a first process tool and supplying ozonated water from the ozonated water generator to a second process tool.

In a third aspect, the invention features an ozonated water control unit. The control unit includes an ozonated water input line for receiving ozonated water from an ozonated water generator, a water input line for receiving water from a source and an ozonated water output line in fluid communication with the ozonated water input line and the water input line. The unit also includes a valve for controlling a flow rate of water in the water input line to produce ozonated water of a second concentration in the output line, in cooperation with a flow rate of ozonated water in the ozonated water input line.

BRIEF DESCRIPTION OF THE DRAWINGS

The invention, in accordance with preferred and exemplary embodiments, together with further advantages thereof, is more particularly described in the following detailed description, taken in conjunction with the accompanying drawings.

In the drawings, like reference characters generally refer to the same parts throughout the different views. Also, the drawings are not necessarily to scale, emphasis instead generally being placed upon illustrating principles of the invention.

DETAILED DESCRIPTION

Figure 1:
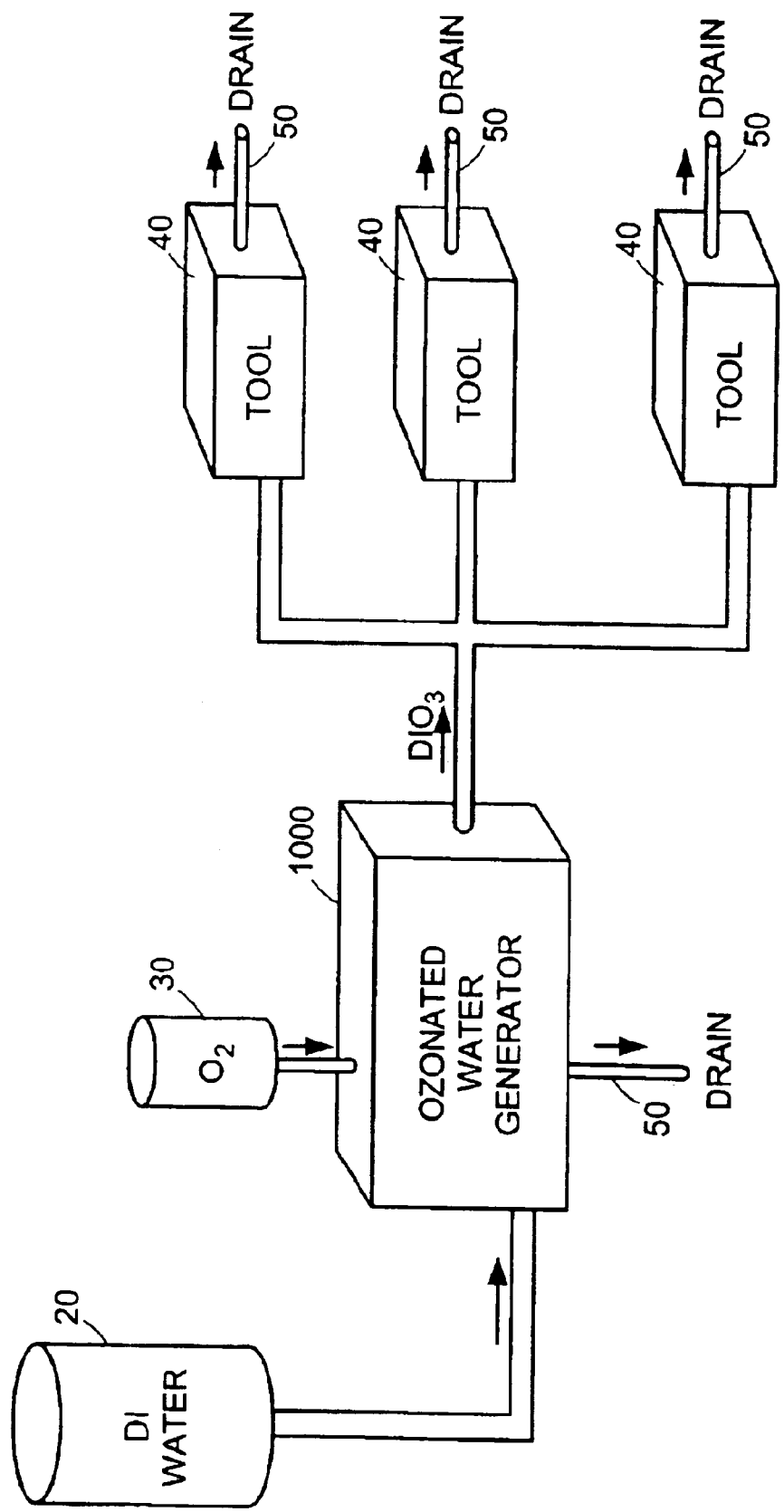
FIG. 1 is a block diagram of an embodiment of the relationship between an ozonated water generator and other components utilized in semiconductor manufacturing.

In highly simplified form, FIG. 1 shows an embodiment of an ozonated water generator 1000 in physical relationship to other components utilized in semiconductor manufacturing. The ozonated water generator 1000 receives deionized water ("DI water") for a DI water supply 20, oxygen ("O2") from an oxygen gas supply 30, and supplies ozonated deionized water ("DIO3") to one or more semiconductor process tools 40. Used or excess DI water or DIO3 can be dumped via drain lines 50. In one aspect, the invention provides an ozonated water generator with improved control, lower cost, and improved reliability.

Figure 2:
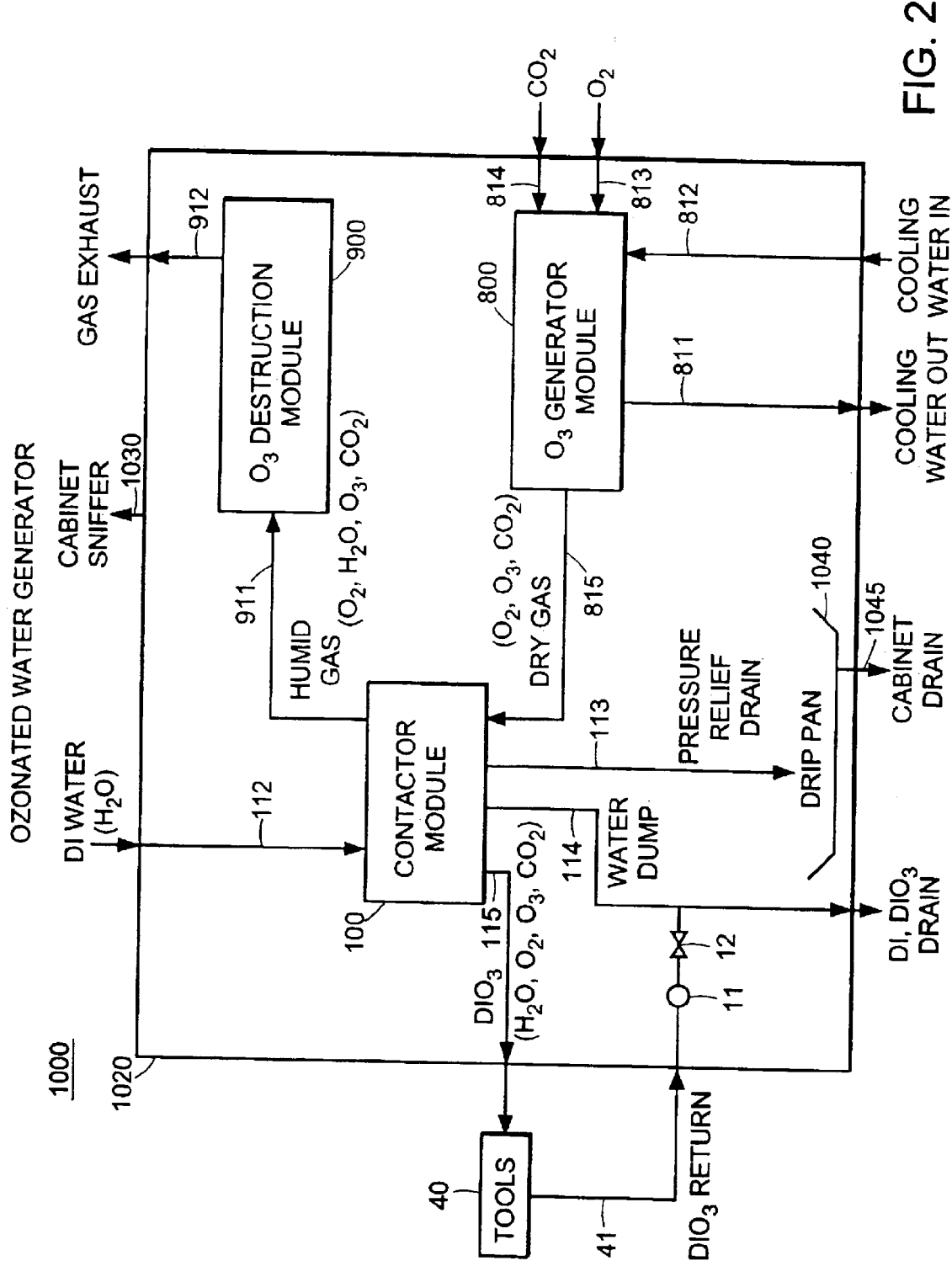
FIG. 2 is a block diagram of an embodiment of an ozonated water generator.

In a more detailed embodiment, the block diagram of FIG. 2 depicts representative modules of the ozonated water generator 10 and related components contained within a cabinet 1020. For clarity, electrical and air pressure control components of the ozonated water generator 10 are not shown.

An ozone ("O3") generator module 800 generates O3 from oxygen delivered by a O2 line 813. A carbon dioxide ("CO2") line supplies CO2 for use by the module 800. Cooling water is supplied to the O3 generator module 800 by a cooling water input line 812 and removed via a cooling water outlet line 811. The O3 generator produces O3, typically mixed with CO2 and O2. Some O2 remains since the conversion to O3 is less than 100% efficient while CO2 is optionally added depending on user needs. This dry gas mixture is delivered to a contactor module 100 via a dry gas line 815.

The contactor module 100 produces DIO3 from DI water supplied via a DI water line 112 and O3 received via the dry gas line 815. The DIO3 generally comprises DI water and O3, O2, and CO2 dissolved in the DI water. The DIO3 is directed toward the semiconductor tools 40 via a DIO3 line 115.

As will be discussed below with reference to FIGS. 4, 5, and 6, in various embodiments of the contactor module 100, the contactor module 100 comprises one or more contractors 110, 120 of varying type. The use of a O3/CO2 gas mixture is optional in the DIO3 generation process, serving in part to stabilize the concentration of O3 in ozonated DI water.

A pressure relief drain line 113 carries water emitted by the contactor module 100 in response to excessive water pressure (described in detail below). Water from the pressure relief drain line 113 is deposited into a drip pan 1040. The drip pan 1040 is also positioned to capture water leaks from the contact module. Liquid may be removed from the drip pan 1040 via a cabinet drain 1045.

A water dump line 114 carries excess DI water or DIO3 to a drain external to the ozonated water generator 1000. Used DIO3 water from the semiconductor tools 40 can be returned to the ozonated water generator 1000 via a DIO3 return line 41, a flow meter 11 and a flow rate control valve 12. This permits the ozonated water generator 1000 to provide complete monitoring and control of the use of DIO3 by the semiconductor tools 40.

The contactor module 100 typically produces a humid gas comprising O2, H2O, O3, and CO2 as an exhaust product of the production of DIO3. The humid gas is directed along the humid gas line 911 to the ozone destruction module 900. The destruction module 900 substantially eliminates ozone from the humid gas prior to exhaust of the humid gas along gas exhaust line 912. This process protects the environment and semiconductor processing workers from the potentially harmful presence of ozone. As an additional safety precaution, the cabinet 1020 is equipped with a gas leak detector 1030, i.e. a cabinet "sniffer", to monitor for ozone gas leaks within the cabinet 1020.

For simplicity in the following descriptions, controlling and monitoring elements related to gas and liquid lines are given common numerical identifiers in FIGS. 3–10. These control and monitoring elements include: volume flow rate meters 11; volume flow rate control valves 12; on/off valves 13; pressure regulators 14; filters 15 (for particulates or condensate); check valves 16; pressure relief valves 17; sample valves 18; flow rate restrictors 19; ozone concentration monitors 20; condensation monitors 21; and temperature gauges 22. These elements are illustrative and not comprehensive. Control and monitoring elements are shown in the Figures primarily for illustrative purposes. The number, type and placement of such elements can be varied with the needs of different embodiments.

It should further be understood that gas and liquid lines are constructed of appropriately selected materials. Dry gas lines and DI water lines can be comprised of stainless steel. Lines carrying liquid or humid gas that contains ozone are typically comprised of a fluoropolymer.

Figure 3:
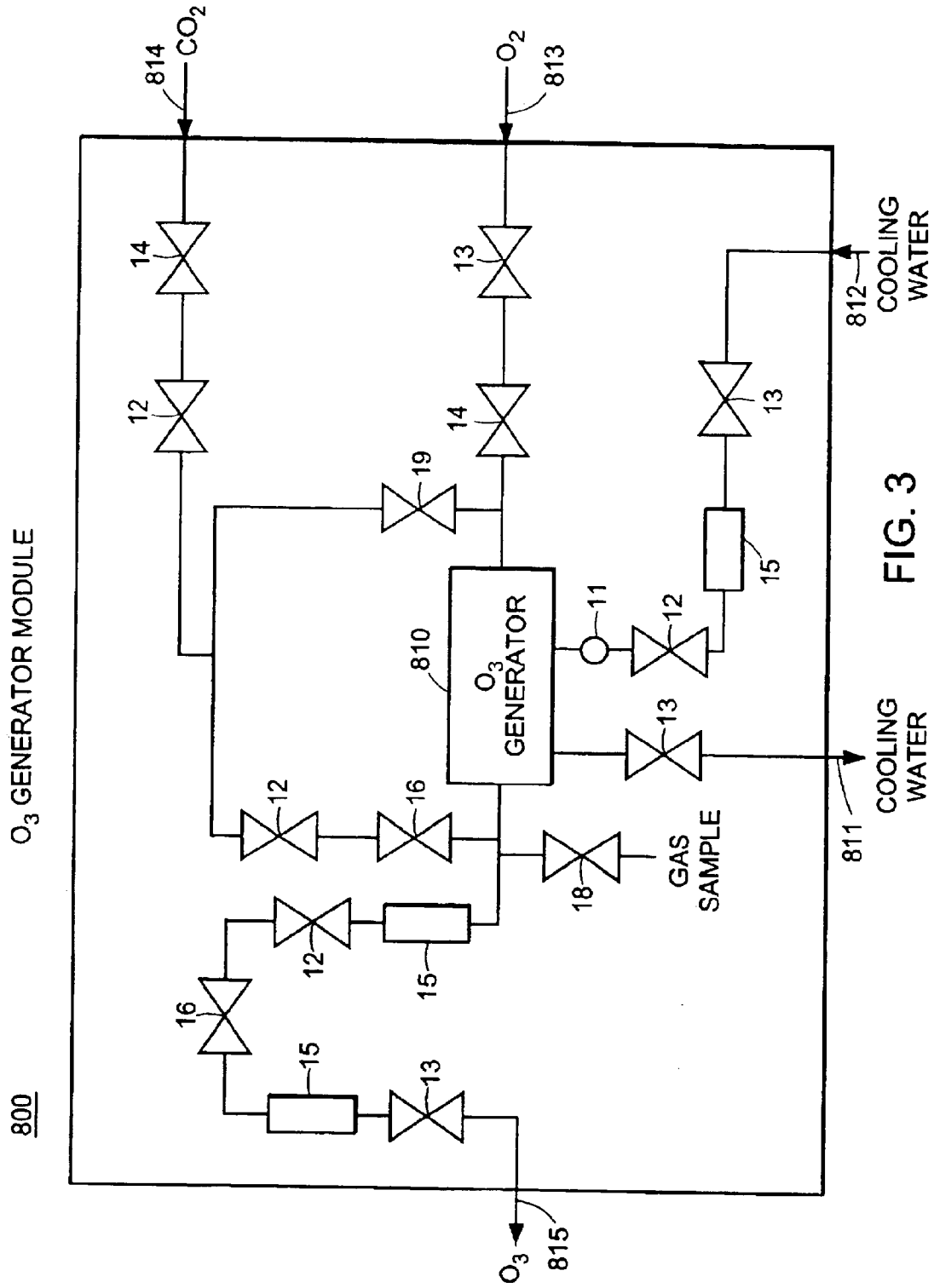
FIG. 3 is a block diagram of an embodiment of an ozone generator module.

FIG. 3 shows a block diagram of an embodiment of the ozone generator module 800 in greater detail. An ozone generator 810 receives oxygen from the O2 line 813 via an on/off valve 13 and a pressure regulator 14 and converts the O2 into O3. CO2 can also be delivered to the ozone generator 810 via the CO2 gas line 814, pressure regulator 14, volume flow rate control valve 12 and flow rate restrictor 19. Further, CO2 can be added to gas after it exits the ozone generator 810 via volume flow rate control valve 12 and check valve 16. The check valve 16 blocks back-flow of gas into the CO2 delivery lines.

In one embodiment, the ozone generator 810 utilizes a dielectric barrier discharge to produce dry ozone. The ozone concentration depends on the volume flow rate through the discharge as well as the power, pressure and temperature of the discharge.

Addition of CO2 to the O2 prior to entry into the ozone generator 810 provides a dopant for the O3 creation process. It protects against long term deterioration of performance of the ozone generator 810 due to oxidation of a power electrode. Alternative dopants can be used, such as N2 or CO. Additional CO2 can be added to the dry gas that exits the ozone generator 810. CO2 has the additional advantage of stabilizing O3 concentrations.

Use of CO2 has other advantages. Use of N2 creates the risk of nitric oxide formation during discharge. This can lead to chromium contaminants even in the presence of electropolished stainless steel tubes.

Large amounts of CO2 are required for stabilization of ozone in DIO3. The half-life governing the decay of ozone is a function of the quality of the DI water. Preferably, this quality should provide a half-life of about 15 minutes. N2, too, can affect stability of ozone, along with the presence of CO2. While high purity CO2 and O2 are preferred, as an alternative, low purity O2, with inherent N2 contamination, can be used, taking advantage of the N2 impurity as a dopant. Typically, N2 of about 50 to 100 ppm or CO2 of about 100 to 500 ppm is required for stabilization. CO2, however, is typically required for enhancement of short-term stability. Hence, CO2 is typically added to the gas both before and after entry into the ozone generator 810.

The resulting dry gas can be sampled via sample valve 18, to determine the concentrations of O3, O2 and CO2. The dry gas then passes to the dry gas line 815 via filter 15, volume flow rate control valve 12, check valve 16, filter 15, and on/off valve 13.

The ozone generator module 800 is also provided with cooling water via the cooling water input line 812 and the cooling water output line 811. The cooling water is delivered to the ozone generator 810 via on/off valve 13, filter 15, volume flow rate control valve 12 and volume flow rate meter 11. After exiting the ozone generator, the cooling water passes through on/off valve 13.

FIGS. 4 through 8 show various embodiments of the contactor module 100. The contactor module 100 generally includes one or more contactors of various types. For example, different types of counter-current contactors can advantageously be employed. In counter-current contactors, gas and water move in opposite directions through the contactor.

Contactors of the counter-current type have further variants. Membrane contactors utilize a hydrophobic membrane to separate gas and liquid within the contactor. Typically, dry gas enters the top of the membrane contactor and exits the bottom, while DI water enters at the bottom and DIO3 exits at the top. Packed contactors in contrast utilize direct contact between gas and liquid, with a packing material used to slow transit through the contactor. Typically, DI water enters at the top while the dry gas enters at the bottom. The packing material increases the duration of contact between gas and liquid. The packing material can comprise, for example, fluoropolymer, quartz, or sapphire.

Since gas and liquid are separated by a membrane in a membrane contactor, pressure differences between the gas and the liquid can exist. Further, the inlet DI water volume flow rate is coupled to the outlet DIO3 volume flow rate. Conversely, liquid and gas pressures are equal in packed column contactors and the inlet and outlet volume flow rates are decoupled. Hence, for short periods, the inlet and outlet volume flow rates can differ. In part due to these differences, membrane contactors have a relatively low maximum volume flow rate though good controllability, while packed column contactors typically have a greater maximum volume flow rate though with poorer controllability.

During interaction of liquid and gas, ozone in the gas dissolves in the liquid. Generally, the ozone concentration in the liquid, at equilibrium, will be proportional to the partial pressure of ozone in the gas. In the case of a packed contactor, for example, the contactor typically operates under pressure to provide the potential for higher ozone concentration DIO3 output. Time of contact between liquid and gas will also affect the ozone concentration in liquid exiting the contactor. For a one yard tall packed contactor, typical duration of liquid passage through the contactor is about 5 to 10 seconds.

Figure 4:
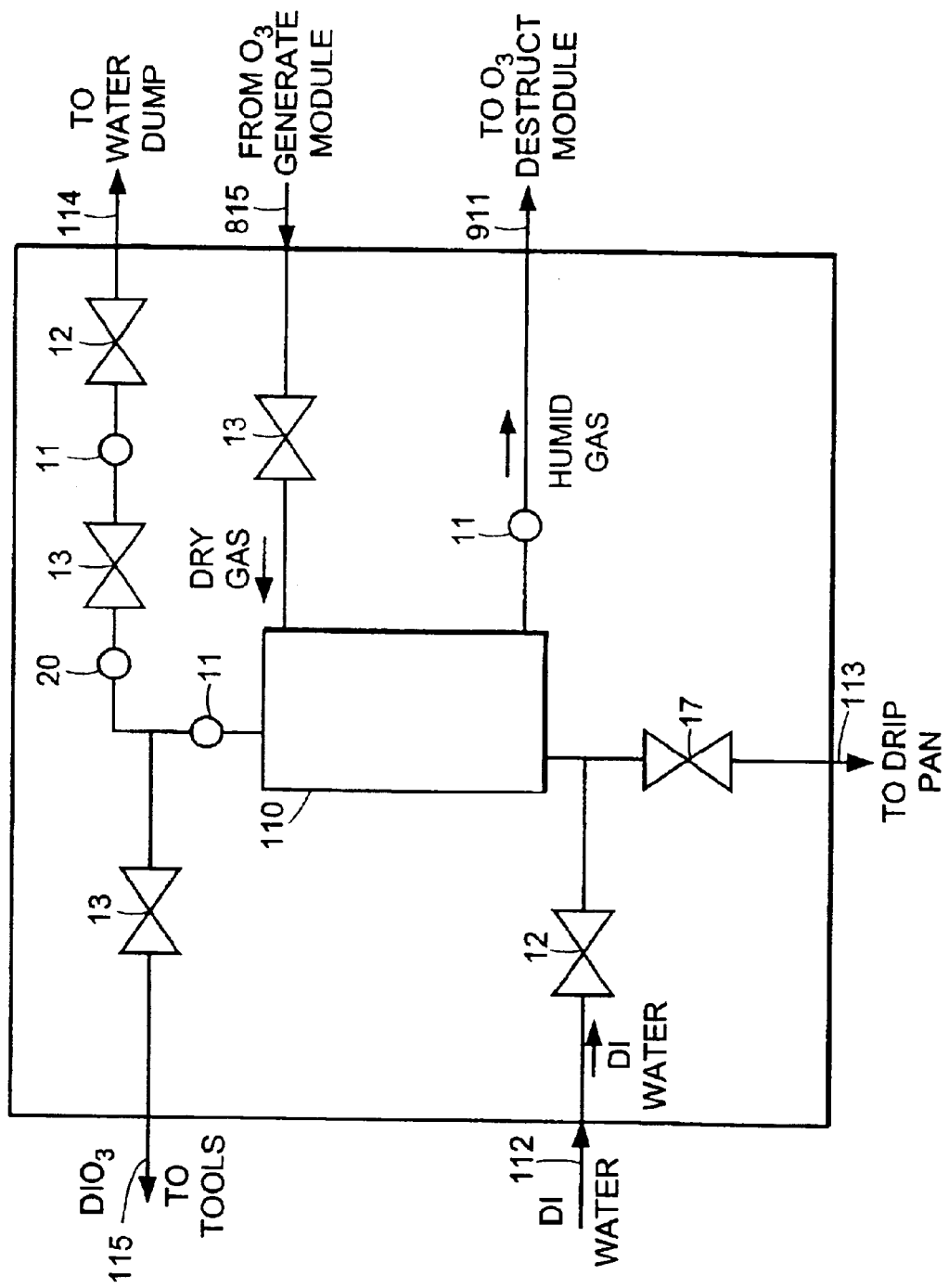
FIG. 4 is a block diagram of an embodiment of a contactor module comprising a membrane contactor.

As shown in FIG. 4, the contactor module comprises a membrane contactor 110. The lower portion of the contactor 110 receives DI water from the DI water line 112 via volume flow rate control valve 12. In the event of excess inlet water pressure, a pressure relief valve 17 can release a portion of DI water to the pressure relief drain line 113. After processing within the contactor 110, the DIO3 leaves the upper portion of the contactor 110 via a volume flow rate meter 11 and is directed to the DIO3 line 115 via an on/off valve 13.

Excess or unneeded DIO3 exiting the contactor 110 can be directed to the water dump line 114 via an ozone monitor 20, an on/off valve 13, a volume flow rate meter 11, and a volume flow rate control valve 12.

The upper portion of the contactor 110 receives the ozone containing dry gas from the dry gas line 815 via an on/off valve 13. Humid gas exists the lower portion of the contactor 110 and is directed to the humid gas line 911 via a volume flow rate meter 11. Subsequently, the ozone destruction module 900 removes ozone from the humid gas.

Figure 10:
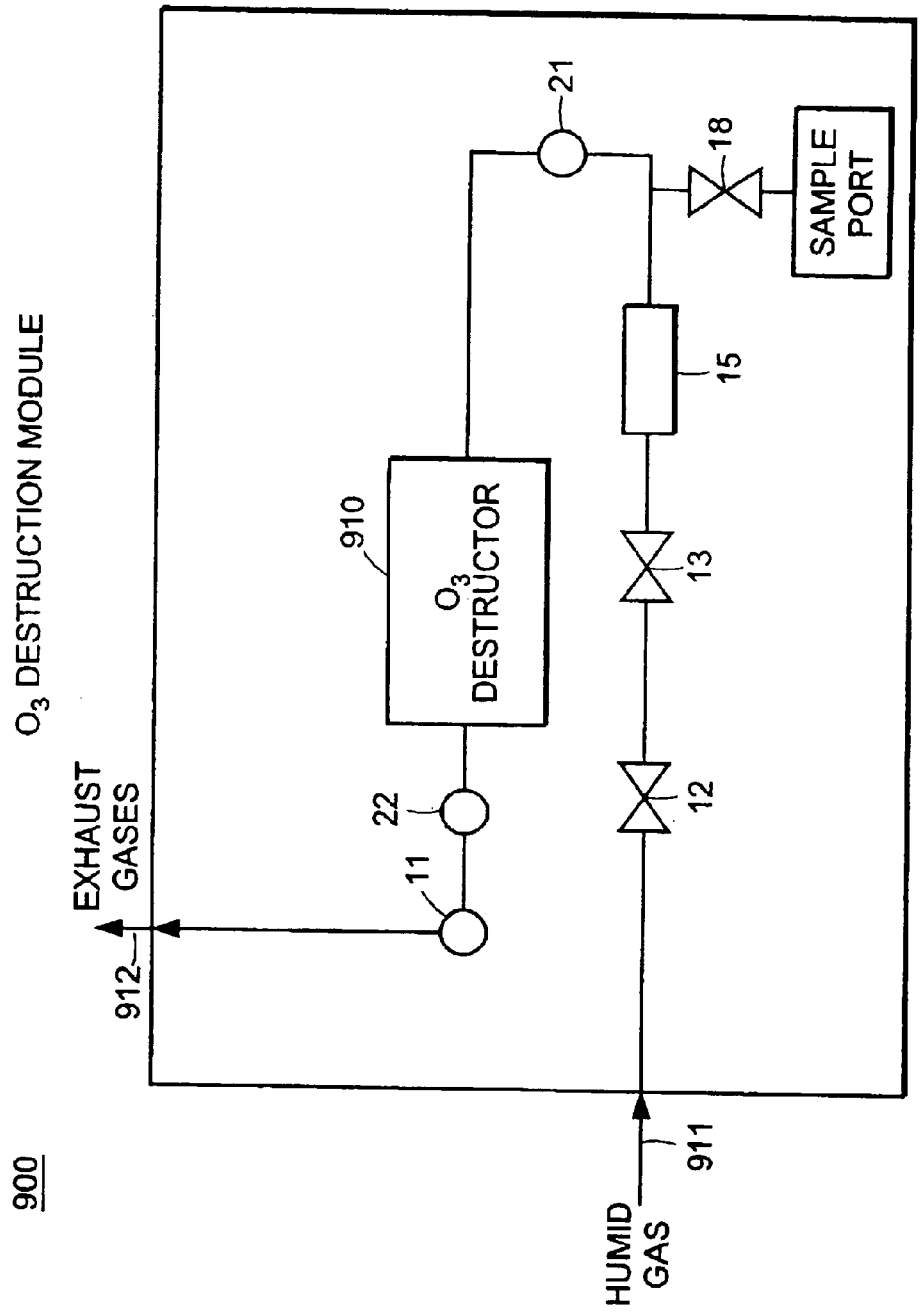
FIG. 10 is a block diagram of an embodiment of an ozone destruction module.

FIG. 10 shows an embodiment of the ozone destruction module 900 in more detail. An ozone destructor 910 receives humid gas from the humid gas line via a volume flow rate control valve 12, an on/off valve 13, a filter 15 and a condensate monitor 21. The humid gas can be sampled via a sample valve 18.

The ozone destructor 910 reduces ozone concentration in the humid gas via use of a catalyst. Exhaust gas from the ozone destructor 910 is directed to the exhaust gas line 912 via a temperature gauge 22 and a volume flow rate monitor 11. Generally, the efficiency of ozone destruction is assumed to be adequate as long as the temperature, monitored via the temperature gauge 22, remains above a minimum level.

Figure 5:
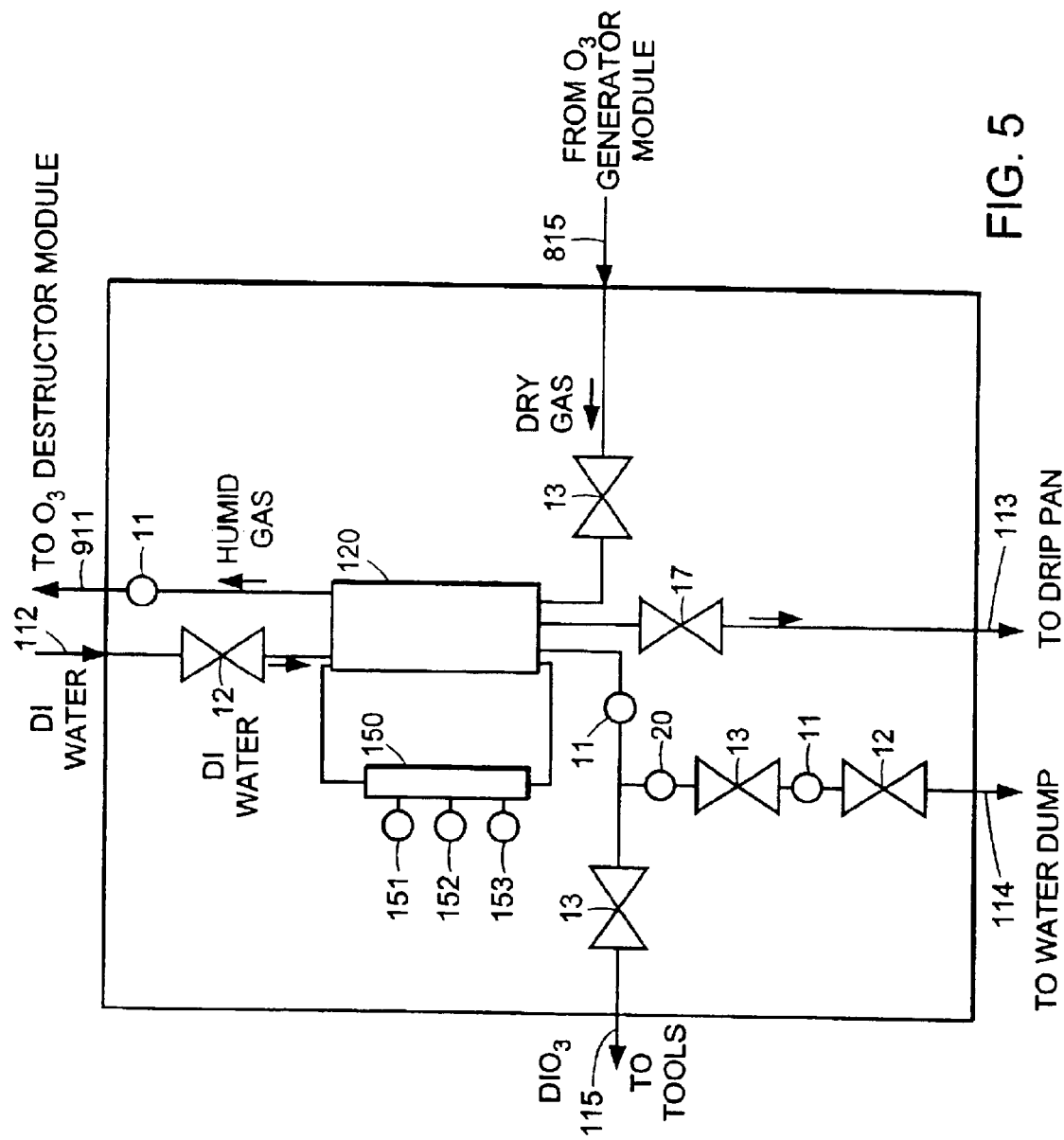
FIG. 5 is a block diagram of an embodiment of a contactor module comprising a packed column contactor.

FIG. 5 shows another detailed embodiment of the contactor module 1001. In this embodiment, the contactor module 100 comprises a contactor 120 of the packed column type. The upper portion of the contactor 120 receives DI water from the DI water line 112 via volume flow rate control valve 12. After processing within the contactor 120, the DIO3 leaves the lower portion of the contactor 120 via a volume flow rate meter 11 and is directed to the DIO3 line 115 via an on/off valve 13.

Excess or unneeded DIO3 exiting the contactor 120 can be directed to the water dump line 114 via an ozone monitor 20, an on/off valve 13, a volume flow rate meter 11, and a volume flow rate control valve 12. In the event of excess water pressure within the contactor 120, a pressure relief valve 17 can release a portion of water residing in the lower portion of the contactor 120 to the pressure relief drain line 113.

The lower portion of the contactor 110 receives the ozone containing dry gas from the dry gas line 815 via an on/off valve 13. Humid gas exits the upper portion of the contactor 120 and is directed to the humid gas line 911 via a volume flow rate meter 11. Subsequently, the ozone destruction module 900 removes ozone from the humid gas.

The embodiment depicted in FIG. 5 further provides for monitoring of liquid level in the contactor 120 through a liquid level sensor 150 that is in fluid communication with the contactor 120. Liquid level is measured via a capacitive gauge 152. Further, if the liquid level drops below a lowest permissible level, as sensed via a light barrier 153, the on/off valve 13 is closed to prevent further removal of liquid. If the level rises above a highest permissible level, as sensed by another light barrier 151, another on/off valve (not shown) is closed to prevent further entry of DI water into the contactor 120. In either case, an alarm is given as notice of the problem condition.

Figure 6:
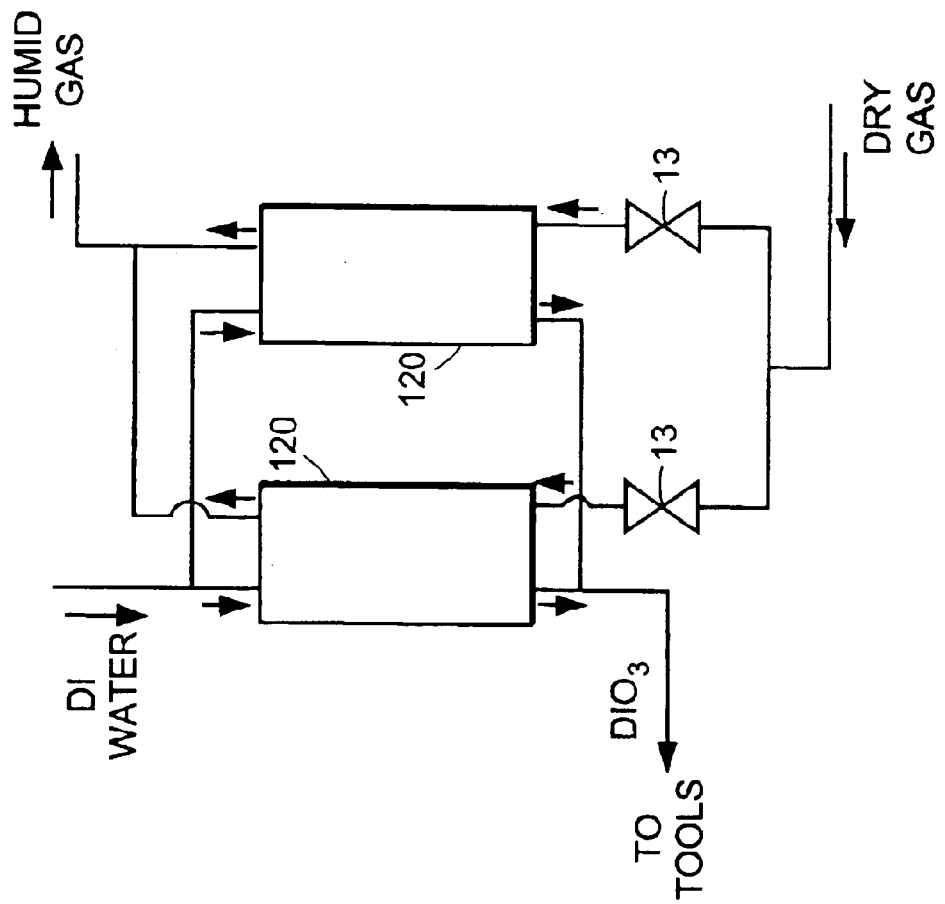
FIG. 6 is a block diagram of an embodiment of a contactor module comprising more than one contactor.

FIG. 6 shows an embodiment of a contactor module 100 that employs two contactors 120 operating in parallel. For clarity, components of the embodiment of FIG. 6 that are comparable to those in FIG. 5 are not shown. Use of two or more contactors 120 in parallel has several advantages, including larger possible flow rates of DIO3 and continued production of DIO3 in the event that one of the contactors 120 fails. Further manufacturing and operation of two relatively small contactors 120 can be less costly than a single relatively large contactor 120. In another embodiment, two or more contactors 120 are operated in series to provide higher possible ozone concentrations in the DIO3.

Figure 7:
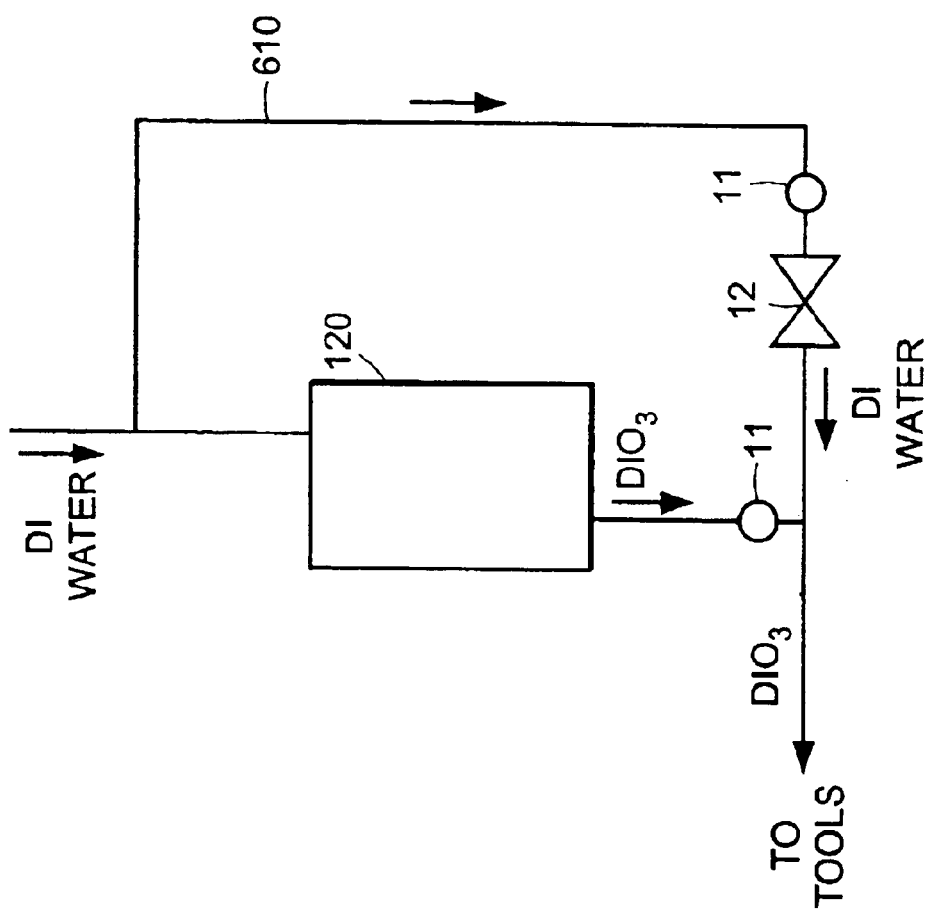
FIG. 7 is a block diagram of an embodiment of a portion of a contactor module.

FIG. 7 shows a portion of a further embodiment of a contactor module 100 that is related, in part, to the embodiment of FIG. 5. For clarity, components of the embodiment of FIG. 7 that are comparable to those in FIG. 5 are not shown. The embodiment is shown with a packed column contactor 120, however, a variety of contactor types can be employed in conjunction with the principles utilized in this embodiment.

A portion of DI water received from the DI water line 112 is diverted by a DI water bypass line 610. Alternatively, a second DI water line (not shown) could supply the DI water bypass line 610.

After passing a volume flow rate meter and a volume flow rate control valve, DI water in the DI water bypass line 610 is mixed with DIO3 exiting the contactor 120. DIO3 derived from this mixture is directed towards the semiconductor tools via the DIO3 supply line 115. By adjusting the flow rate of DI water in the bypass line 610, the ozone concentration and flow rate of DIO3 in the DIO3 line can be varied.

Figure 11:
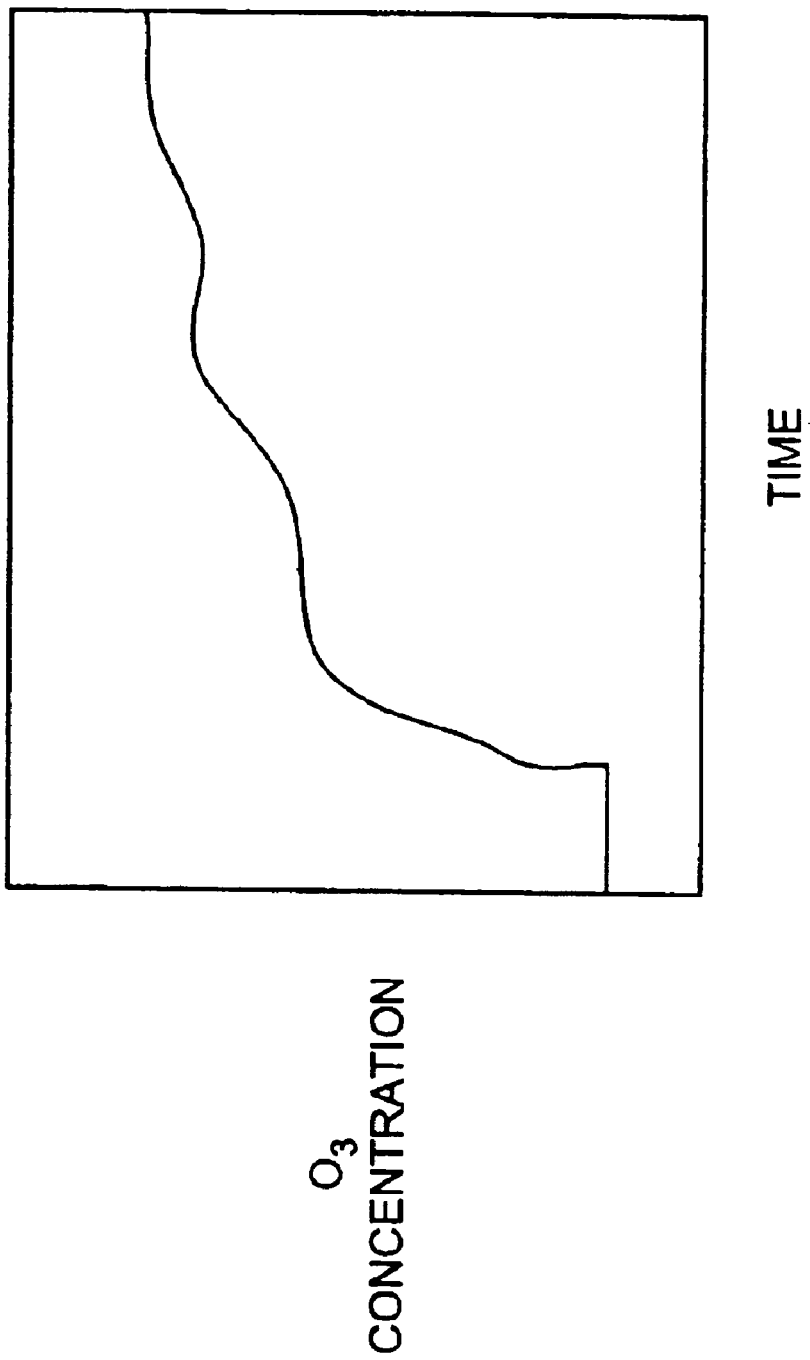
FIG. 11 is a graph of ozone concentration versus time in ozonated deionized water output from a contactor.

A number of advantages arise from the use of the bypass line 610. Typically, prior art ozonated water generators produce ozone concentration transients in DIO3 when implementing a demand for a change in concentration. Changing the flow rate of DI water or dry gas entering a contactor to change ozone concentration leads to a period of time during which conditions within the contactor transition to a new steady-state. This effect is illustrated by the graph shown in FIG. 11.

For example, by decreasing the flow rate of DIO3 exiting a contactor, the concentration of ozone in the DIO3 can be increased. Decreasing the flow rate can be used to increase time span that water spends within the contactor 110, 120. This permits greater duration of interaction between the water and ozone within the gas. There is a time delay, however, during which DIO3 exiting the contactor has not spent the full, increased time span within the contactor. Hence, the ozone in exiting DIO3 gradually increases to the new, desired level. Further, ringing or oscillations in concentration, as illustrated qualitatively in FIG. 11, can be superimposed on the gradually increasing ozone concentration.

These effects are generally undesirable in semiconductor processing. Users of DIO3 often wish to make immediate, stable adjustments in concentration level. By adjusting the flow rate of DI water in the bypass line 610, relatively immediate and stable changes in ozone concentration in DIO3 delivered to the DIO3 line 115 can be achieved. Excess DIO3 beyond that required by the semiconductor tools 40 can be directed to the water dump line 114.

Using the above approach, a constant flow rate of water in the contactor 110, 120 can be maintained to maintain a stable ozone concentration in DIO3 exiting the contactor 110, 120. This very stable supply of DIO3 can then mixed with DI water of a variable flow rate to achieve desired changes in concentration in DIO3 delivered to the DIO3 line 114. In a related embodiment, a constant, low flow rate of water is maintained in the contactor 110, 120 at all times, even when DIO3 demand from the semiconductor tools is zero. With a constant flow, DIO3 is nearly immediately available. Further, with a relatively low flow rate in the contactor, relatively little volume flow of DIO3 need be dumped when no DIO3 is needed. At these times, DI water flowing through the bypass line 610 can be reduced or shut off to further conserve water.

As an example of the above method, the contactor 120 can be operated at a constant flow rate of 5 l/min (liters per minute) with an exit DIO3 ozone concentration of 80 ppm. Mixing a 15 l/min flow rate of DI water from the bypass line 610 with this contactor 120 output will yield DIO3 of 20 ppm at a flow rate of 20 l/min in the DIO3 line 114. The full 20 l/min of DIO3 at 20 ppm concentration can be utilized by the semiconductor tools 40, or a portion can be dumped.

Further benefits can accrue through use of the above method. As one example, maintaining water flow in the contactor 110, 120 or in the bypass line 610 can reduce bacterial growth. For example, DI water flow can be maintained in the bypass line 610 to provide continuous flow in the bypass line 610 and other DI water carrying lines to protect these lines against bacterial growth. As another example, changes in liquid flow rates through a contactor 110, 120 can cause pressure spikes leading to failure of the contactor 110, 120. Use of the above method to reduce or eliminate these flow rate changes can thus increase contactor 110, 120 reliability.

Figure 8:
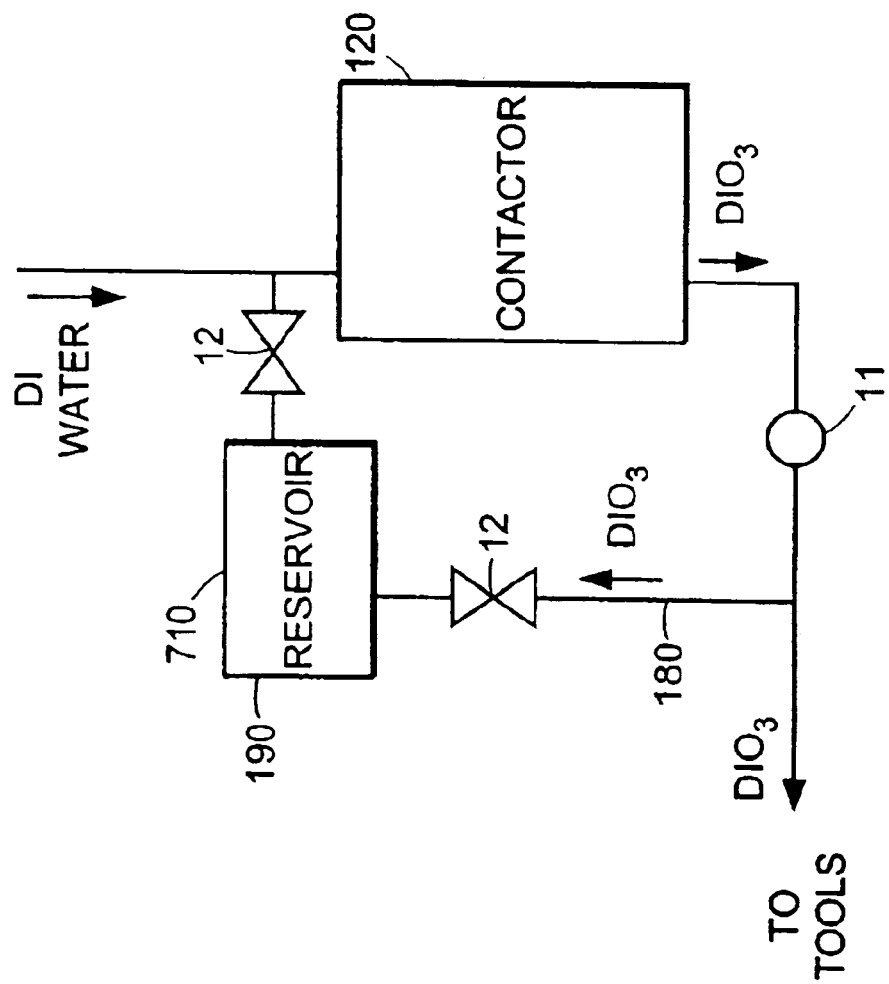
FIG. 8 is a block diagram of an embodiment of a portion of a contactor module.

FIG. 8 shows a portion of a further embodiment of a contactor module 100 that is related, in part, to the embodiment of FIG. 5. For clarity, components of the embodiment of FIG. 8 that are comparable to those in FIG. 5 are not shown. The embodiment is shown with a packed column contactor 120, however, a variety of contactor types can be employed in conjunction with the principles utilized in this embodiment.

After exiting the contactor 120 and passing a volume flow rate meter, a portion of DIO3 can be diverted via a recirculation line 180 to again enter the contactor 120, optionally via a reservoir 710. Though not shown, a water pump can be included to urge the DIO3 towards the contactor 120. The reservoir, in part, provides buffering, i.e. storage, of diverted DIO3 to permit greater control over recirculation of diverted DIO3.

The diverted DIO3 can reenter the contactor 120 via a liquid line connector used for DI water received from the DI water line 112. Alternatively, the contactor 120 can include a separate connector for the diverted DIO3 to reenter the contactor 120.

With recirculation of diverted DIO3 through the contactor, DIO3 of increased ozone concentration can be obtained. This provides advantages over prior art ozonated water generators. For example, higher ozone concentration DIO3 can be produced in comparison to prior generators that incorporate a comparable contactor. Further, a smaller, less expensive contactor can be employed to produce DIO3 of a desired ozone concentration level.

Figure 9:
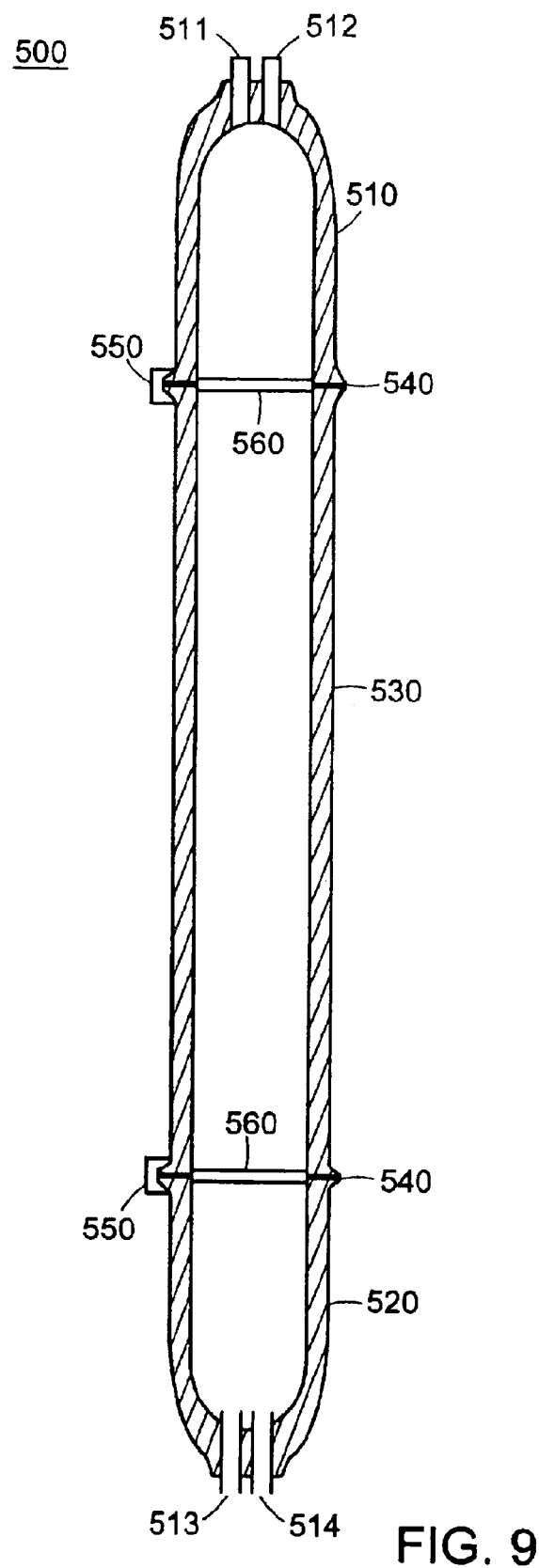
FIG. 9 is a cross-section of an embodiment of a packed column contactor.

With reference to the cross-sectional view of FIG. 9, an improved packed column contactor 500 is now described. The contactor 500 can be advantageously employed in various embodiments of the contactor module 100, such as those described above.

The contactor 500 comprises a liquid and gas interaction vessel within which elevated pressures are maintained during operation of the contactor 500. The vessel comprises a first end portion 510 and a second end portion 520. As shown in FIG. 9, the vessel further comprises a central portion 530. The first end portion 510 is joined to a first end of the central portion 530 while the second end portion 520 is joined to a second end of the central portion 530, to provide a substantially liquid and gas tight liquid and gas interaction vessel. Within the vessel are packing restraints 560 and packing material (not shown).

The portions 510, 520, 530 are preferably formed from a polymer that comprises a fluoropolymer. The fluoropolymer is selected from a group comprising pertetrafluoroethylene, perfluoroalcoxy, polyvinlydifluoride, and fluoroethylenepropylene. Generally, materials with ozone resistance can be considered for use in forming the portions 510, 520, 530. The portions 510, 520, 530 can be manufactured by various means. For example, some fluoropolymers, such as perfluoroalcoxy, are amenable to injection molding. Other, such as pertetrafluoroethylene, can be machined.

A sufficient wall thickness of the portions 510, 520, 530 is chosen to provide self-supporting mechanical stability during pressurized operation of the contactor. Hence, unlike prior art packed column contactors, the contactor 500 requires no stainless steel housing.

Assuming a cylindrical shaped vessel, a sufficient wall thickness can be calculated through use of the following equations:

$$t=r(P/\sigma_{max});$$

$$\sigma_{max}=(1/s)\sigma_y;$$

where t is the required wall thickness, r is the internal radius of the vessel, P is the internal pressure, $\sigma_{max}$ is the maximum allowable tensile wall stress, $\sigma_y$ is the yield strength for the particular material used to form the vessel portions, and s is the safety factor. Using a greater safety factor with a particular vessel material, i.e. a particular maximum allowable tensile wall stress, will lead to a greater thickness t for a given operating pressure P.

For example, for an operating pressure of 0.75 MPa (million pascals), i.e. about 7.5 atmospheres, an internal radius of 3 inches, a safety factor of 2, and vessel portions 510, 520, 530 comprising perfluoroalcoxy with a yield strength of 15 MPa, the calculated required wall thickness is 0.3 inch. Use of a smaller safety factor, for example about 1, would allow use of a thickness of about 0.15 inch. Where a more conservative design is desired, a safety factor of 4, for example, would give a required thickness of 0.6". Greater thicknesses can be used, for example 1.2 inches or more, however this can add to the cost and weight of the contactor 500.

Alternatively, the thickness of vessel portions can be derived empirically, by manufacturing vessels of varying thickness and subjecting these samples to varying test pressures to determine failure pressure. In some embodiments, the thickness varies at different sites on the vessel. For example, thicker end portions 510, 520 can be used to provide more stability for gas or liquid line attachments to the contactor 500.

Pressure tightness and stability at the joints between the portions 510, 520, 530 can be assisted via use of, for example, gaskets 540 and clamps 550 (clamps are indicated only on one side of the vessel in the cross section of FIG. 9).

The contactor 500 has several advantages over prior packed column contactors. The stainless steel housing of prior contactors leads to a relatively very heavy and expensive contactor, generally requiring top and bottom steel flanges. Such prior contactors typically incorporate a difficult to manufacture polytetrafluoroethylene liner. In contrast, the contactor 500 requires few parts, all of which can be produced via relatively inexpensive injection molding techniques. This can provide a packed column contactor 500 that is more reliable than prior packed column contactors at a cost about 80% less than prior packed column contactors. Further, via injection molding, liquid or gas line connectors 511, 512, 513, 514 can be formed as integral portions of the first end portion 510 or the second end portion 520 for a further reduction in contactor parts and cost, and increased reliability.

Figure 12:
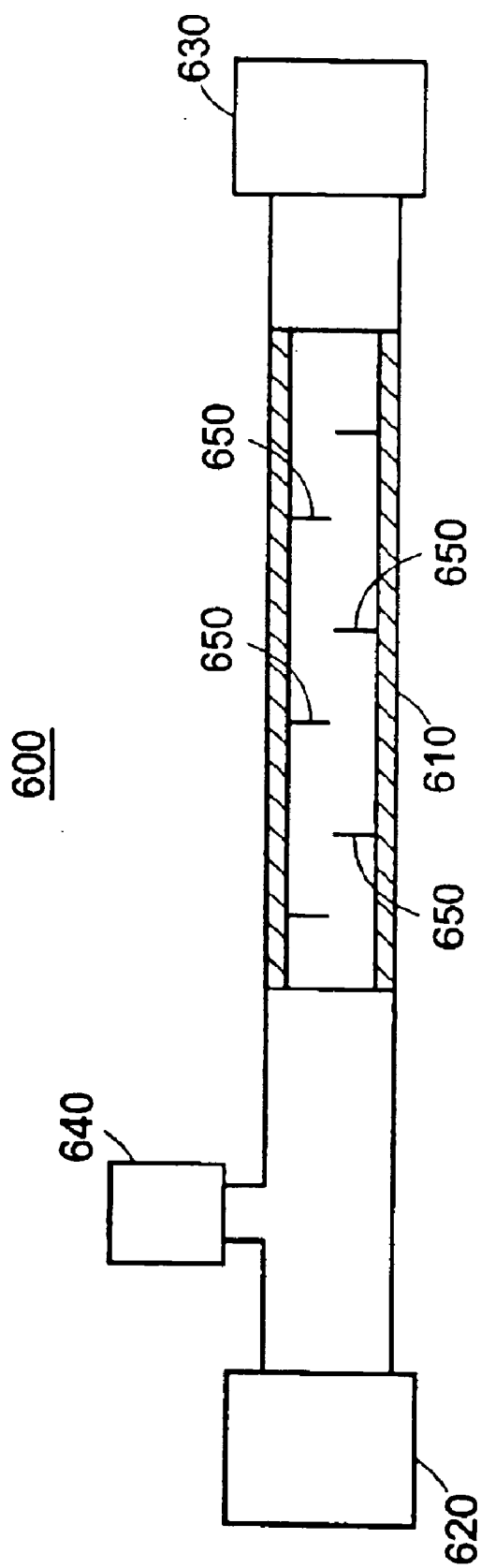
FIG. 12 is a block diagram of an embodiment of a contactor.

FIG. 12 shows an embodiment of a contactor 600 of particular use in providing ozonated liquids for semiconductor wet bench processing. The contactor 600 can be used independently of the ozonated water generator 1000.

The contactor 600 includes a tubular portion comprising a housing 610 made from a material that is compatible with semiconductor processing. A fluoropolymer is preferred, such as perfluoroalcoxy (PFA) to provide compatibility with the presence of hydrofluoric acid. A first end of the housing 610 is joined in fluid communication with a first fitting 620. The first fitting is used for connection to a liquid supply line, for example a DI water supply line or a sulfuric acid supply line. A second end of the housing 610 is joined in fluid communication with a second fitting 630. The second fitting is used for connection to an ozonated liquid supply line. A third fitting 640 is joined in gaseous communication with a side of the housing 610 preferably nearer to the first fitting 620 than to the second fitting 630. The third fitting 640 is used for connection to a gas supply line, the gas comprising ozone. The fittings 620, 630, 640 are made with use of semiconductor processing compatible components, for example Flaretek® port connections available from Entegris, Inc. (Chaska, Minn.).

The tubular portion further comprises one or more internal mixing elements 650, some of which are seen, in FIG. 12, in a cut away cross section of the tubular portion. The elements 650 cause turbulence and mixing of gas that enters the housing 610 via the third fitting 640 and liquid that enters the housing 610 via the first fitting 620. This mixing helps to provide a relatively high efficiency mass transfer of ozone diffusion into the liquid.

A variety of turbulence inducing shapes are suitable for the elements 650. Curved shapes are preferred, with an extent along the length of the housing 610 greater than an internal width of the housing 610. An internal width of the housing 610 is about 5 to 30 millimeters and preferably 15 millimeters for typical semiconductor processing applications.

In one embodiment, each of the elements 650 has upstream and downstream ends that are substantially flat and twisted relative to each other. The symmetry of the twist can alternate, for example from left-handed to right-handed corkscrews, from element 650 to element 650 along the housing 610. In another embodiment, the symmetry alternates in groups of elements 650. In another embodiment, the element 650 symmetry alternates randomly.

The contactor 600 has particular utility in supplying ozonated liquids to semiconductor processing wet benches.

Figure 13A:
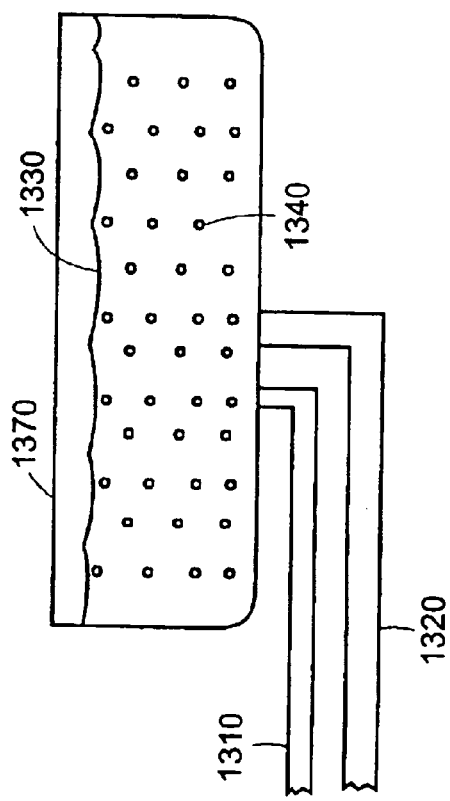
FIG. 13a is a prior art wet bath.

FIG. 13a shows a typical prior art wet bench 1370. A liquid, such as deionized water or sulfuric acid, is delivered to the wet bench 1370 along a liquid delivery line 1320. Ozone is delivered separately to the wet bench 1370 via an ozone delivery line 1310. Ozone bubbles 1340 are injected into liquid 1330 in the wet bench 1370. As the ozone bubbles 1340 rise through the liquid 1330, a portion of the ozone diffuses into the liquid, providing an ozonated liquid for treatment of semiconductor wafers residing in the wet bench (not shown).

Figure 13B:
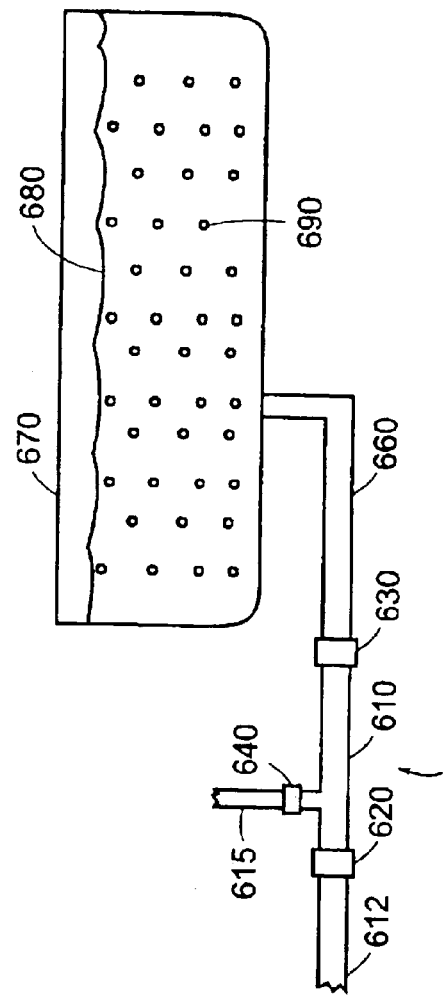
FIG. 13b is an embodiment of a wet bath system comprising the contactor of FIG. 12.

In contrast to prior art methods, a wet bench system is shown in FIG. 13b. The contactor 600 receives ozone from a gas supply line 615 and liquid from a liquid supply line 612 and delivers ozonated liquid 680 to an ozonated liquid delivery line 660 for delivery to a wet bench 670. Though ozone bubbles 690 are present in the ozonated liquid 680, the turbulent mixing of liquid and ozone gas prior to delivery to the wet bench 670 has several advantages. The ozonated liquid 680 in the wet bench 670 has an ozone concentration that is more uniform and, if desired, greater than in prior art methods. Further, more efficient use is made of ozone gas. Existing wet bench systems of the prior art type can be readily converted to the type shown in FIG. 13b, largely using existing plumbing.

Provision of ozonated DI water following the principles illustrated by the embodiment of FIG. 13b has several advantages over use of ozonated water generators for supply to a wet bench 670. The embodiment of 13b is far less expensive and far more reliable. Further, reduced downtime due to a highly reliable ozonated DI water source reduces the very high costs typically associated with shutdowns of a semiconductor manufacturing process line. Reduced repairs further add to the safety of a manufacturing operation.

In the following, highly pure water, as typically used in semiconductor processing is variously referred to as DI water, water, pure water and ultra-pure water (UPW).

Figure 14:
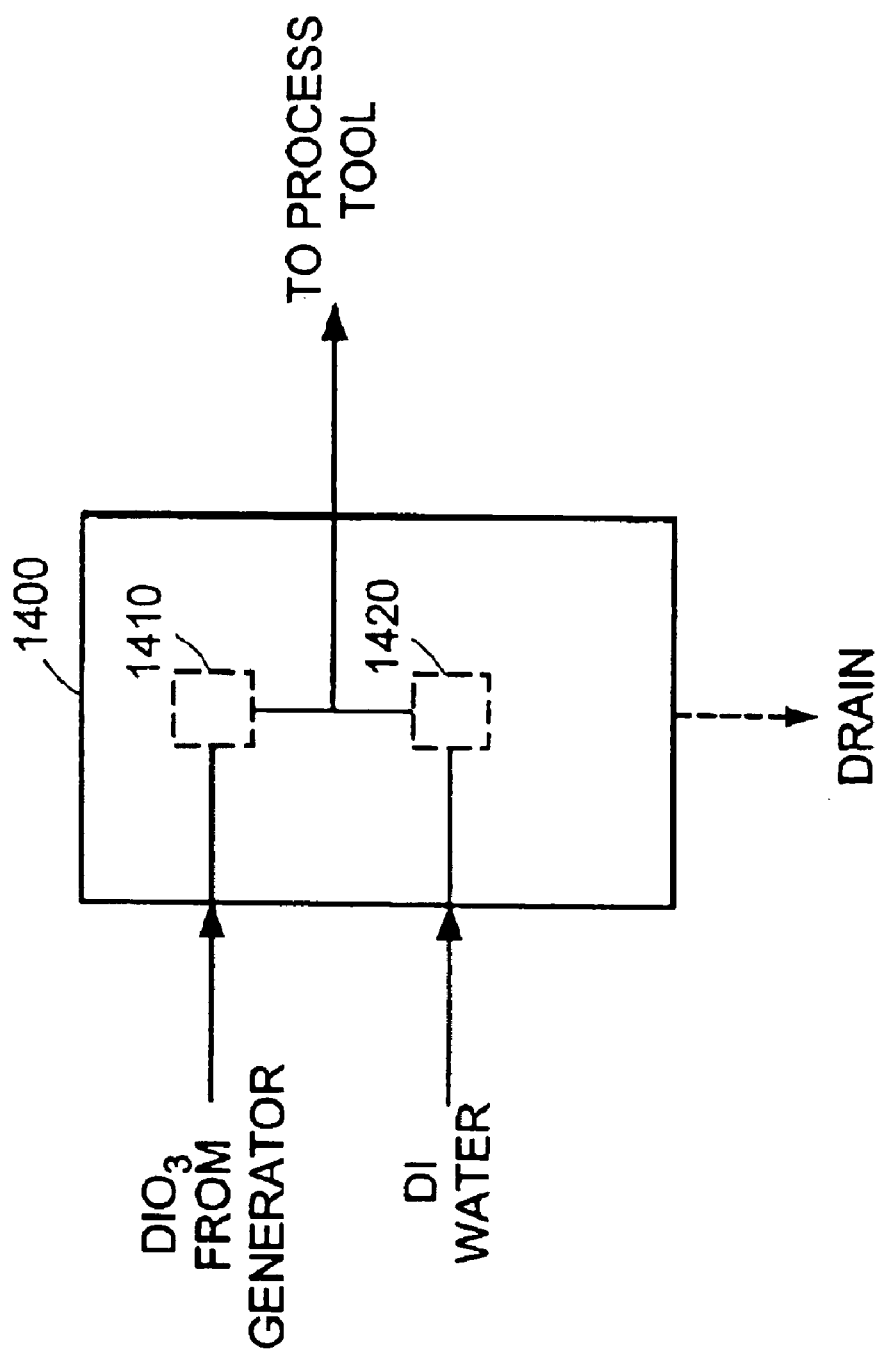
FIG. 14 is block diagram of an embodiment of an ozonated water control unit.
Figure 15:
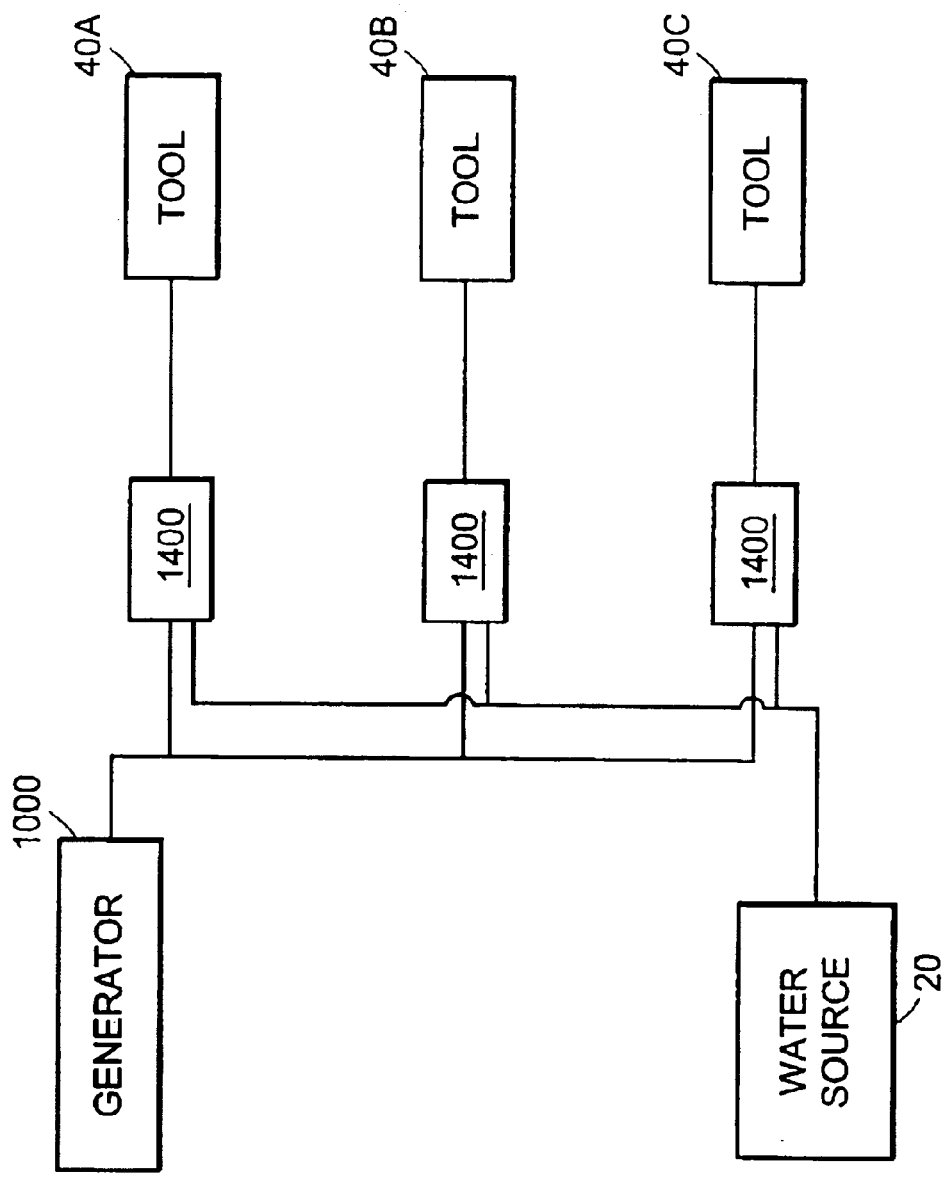
FIG. 15 is a block diagram of an embodiment of multiple ozonated water control units, an ozonated water generator, a pure water source and three process tools.
Figure 16:
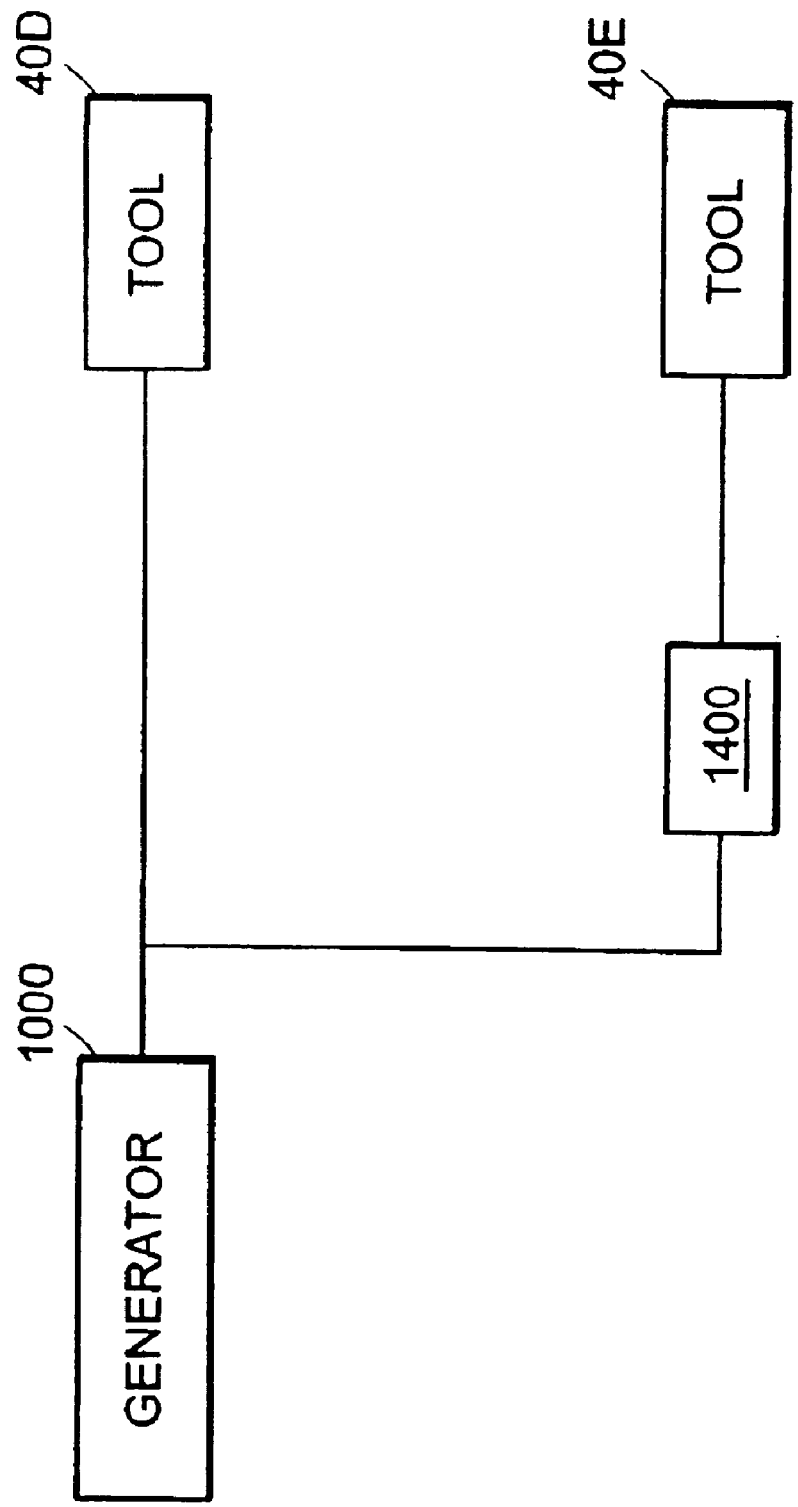
FIG. 16 is a block diagram of an embodiment of an ozonated water generator and a control unit delivering ozonated water to two process tools.

FIGS. 14–16 illustrate embodiments of apparatus and methods to control ozonated water flow and concentration. FIG. 14 is block diagram of an embodiment of an ozonated water flow and concentration control unit 1400. The unit 1400 receives ozonated water from an ozonated water generator and DI water from a DI water source. After mixing the received liquids, the unit 1400 delivers ozonated water of a modified ozone concentration and/or flow rate to one or more process tools.

The unit 1400 can include a DIO3 flow control valve 1410 and/or a DI water flow control valve 1420. The valves 1410, 1420 can be used to control the concentration of ozone in ozonated water exiting the unit 1400 by controlling a mix volume ratio of ozonated water from the generator and water from the DI water source. The valves 1410, 1420 can also be used to control the flow rate of output ozonated water. References to DI water are herein understood to encompass highly pure water as commonly used in semiconductor processing.

The control unit 1400 permits control of ozonated water concentration and/or flow rate for one or more process tools while an ozonated water generator operates in a steady-state. As described below, use of one or more units 1400 permits a single generator to supply two or more process tools each with a different concentration of ozonated water.

A "process tool" as used in the present description refers to any piece of equipment, or portion of a piece of equipment, that utilizes ozonated water. For example, separate baths in a single piece of equipment can be separate process tools.

FIG. 15 is a block diagram of an embodiment of multiple control units 1400, an ozonated water generator 1000, a pure water source 20 and three process tools 40A, 40B, 40C. The control units 1400 work in cooperation with the ozonated water generator 1000 to separately control the parameters of ozonated water delivered to the process tools 40A, 40B, 40C. Other embodiments include more or fewer process tools, and/or additional generators 1000.

FIG. 16 is a block diagram of an embodiment of a generator 1000 and a control unit 1400 delivering ozonated water to two process tools 40D, 40E. The generator 1000 delivers ozonated water directly to one of the process tools 40D, and thus directly controls the concentration of the ozonated water that is delivered to the tool 40D. The control unit 1400 controls the concentration of ozonated water delivered to the second tool 40E.

Other embodiments vary the number of process tools, and vary the number of the process tools that receive ozonated water via one or more control units 1400. Some embodiments include two or more generators 1000, for example, to provide a greater quantity of ozonated water.

Figure 17:
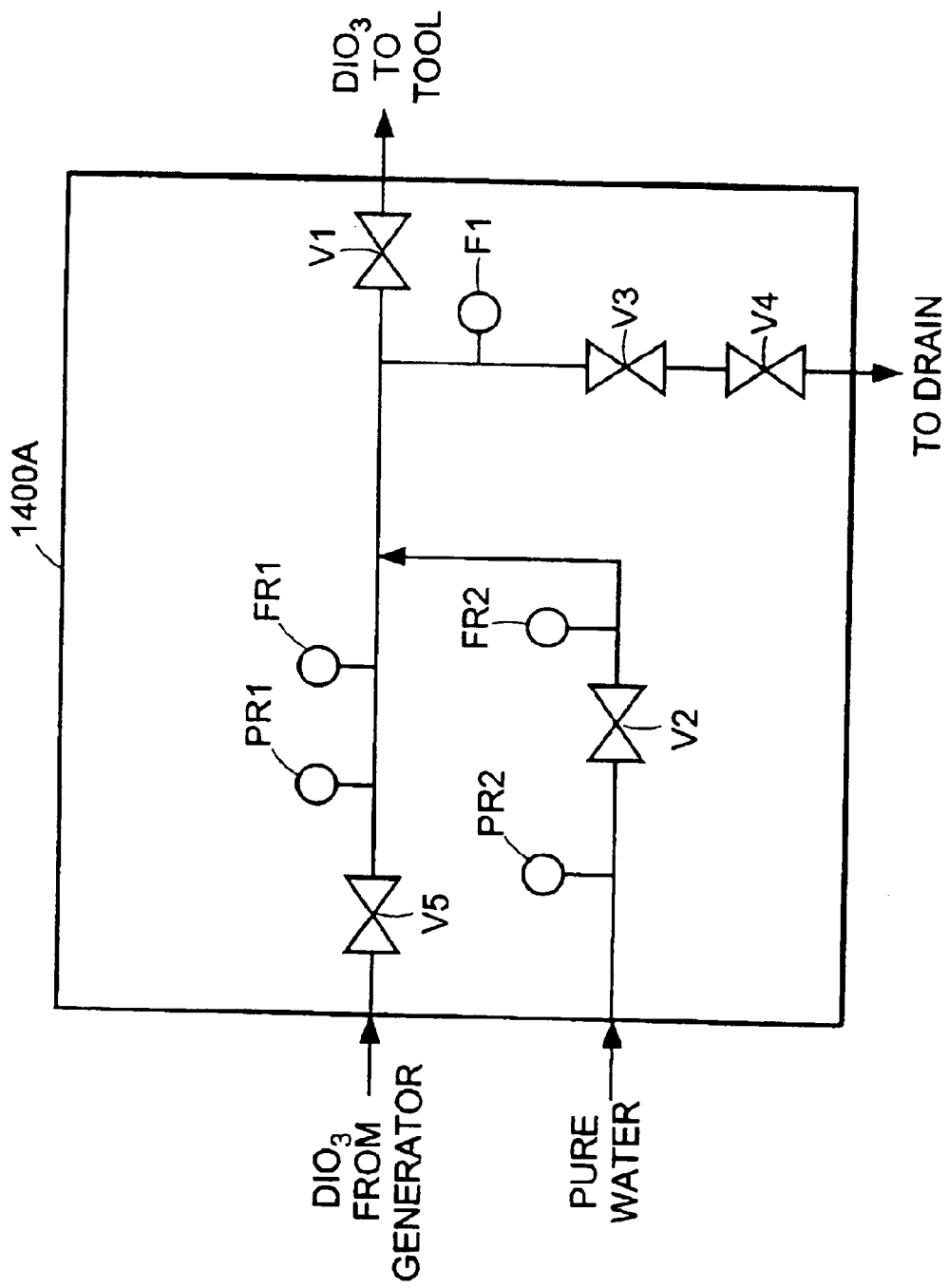
FIG. 17 is a detailed block diagram of an embodiment of a ozonated water control unit.

FIG. 17 is a detailed block diagram of another embodiment of a control unit 1400A, which illustrates one detailed implementation. The control unit 1400A includes: pneumatic control valves V1, V2; pneumatic shutoff valves V4, V5; a manual adjust valve V3; a flow indicator F1; pressure sensors PR1, PR2; and flow sensors FR1, FR2. The pneumatic valves V1, V2, V4, V5 are operated using, for example, compressed dry air.

The control unit 1400A operates as follows. Desired tool process flow rate and ozone concentration are set via a control panel portion of the control unit 1400A, or set remotely via computer control. The control unit 1400A can receive, from an ozone generator, the value of the concentration of incoming ozonated water.

Incoming ozonated water passes through a pneumatic shutoff valve V5, and has its pressure and flow rate measured respectively by a pressure sensor PR1 and a flow sensor FR1. Similarly, incoming pure water passes through a pneumatic shutoff valve V2, and has its pressure and flow rate measured respectively by a pressure sensor PR2 and a flow sensor FR2. The two fluids are mixed after passing the flow sensors FR1, FR2, and then pass through a pneumatic valve V1 to exit the control unit 1400A.

The control unit 1400A compares the selected ozone concentration with the concentration of the incoming ozonated water, and responsively selects a required dilution ratio. The pneumatic valve V2 in the pure water line is adjusted, and the resulting flow rates obtained by the flow sensors FR1, FR2 are compared. Adjustments continue, via a closed loop process, until the flow rates provide the selected dilution ratio.

The control unit 1400A can also determine the total flow rate measured by the flow sensors FR1, FR2, and compare the total to the selected flow rate for the output ozonated water. The pneumatic valve V1 near the output port can be adjusted via a closed loop until the selected output flow rate is achieved.

The manual valve V3 permits, for example, adjustments to obtain a desired level of flow to a drain, as measured via the flow indicator F1. The flow to drain passes through one of the pneumatic shutoff valves V4. Monitoring of the pressure sensors PR1, PR2 can permit emergency shutoff, if, for example, safe pressure levels are exceeded.

In one embodiment, the generator 1000 delivers ozonated water that is saturated with ozone and a control unit performs mixing under pressure, to avoid out-gassing of the ozone. In one embodiment, incoming saturated ozonated water passes through a straight input line of uniform dimension.

Features of the invention can provide numerous benefits, for example, rapid setting of concentration and flow rate which enables fast ramp up and ramp down of the process fluid (allowing optimized process cycles in stop/go mode), and an enlarged flow and concentration performance range of a process fluid.

In illustrative embodiments, a control unit 1400 receives ozonated water having a flow rate in a range of approximately 0 to 35 liters/min, and DI water having a flow rate in a range of approximately 0 to 42 liters/min. A preferred drain flow is in a range of approximately 0 to 2 liters/min. Ozone concentration in output ozonated water can be in a range of 0% to 100% of input ozonated water concentration. It is herein understood that 0% ozone concentration in output ozonated water can be obtained by delivering only DI water to the output of a control unit.

While the invention has been particularly shown and described with reference to specific preferred embodiments, it should be understood by those skilled in the art that various changes in form and detail may be made therein without departing from the spirit and scope of the invention as defined by the appended claims. For example, a control unit can be used to control the flow and/or concentration parameters for two fluids other than ozonated water and/or DI water. For example, a control unit can control the mixing of more than two fluids. For example, a control unit can include two or more outputs; each output can supply ozonated water having a different concentration.

What is claimed is:

1. A method for supplying ozonated water to more than one process tool, comprising:

receiving ozonated water having a first concentration from an ozonated water generator;

receiving water from a source;

mixing the received ozonated water and the received water from the source to produce ozonated water having a second concentration; and supplying ozonated water having the second concentration to a first process tool, while supplying ozonated water from the ozonated water generator to a second process tool.

2. The method of claim 1 wherein supplying ozonated water from the ozonated water generator to the second process tool comprises mixing ozonated water from the ozonated water generator and water from the source to produce ozonated water having a third concentration, and supplying the ozonated water having the third concentration to the second process tool.

3. The method of claim 1 wherein mixing comprises selecting a ratio of a flow rate of the received ozonated water to a flow rate of the received water from the source to produce the ozonated water having a second concentration.

4. The method of claim 3 wherein mixing further comprises adjusting at least one of the flow rate of the received ozonated water and the flow rate of the received water to provide the selected ratio.

5. The method of claim 1, further comprising selecting a flow rate of ozonated water having the second concentration, and controlling a flow rate of the received ozonated water and a flow rate of the received water from the source to produce the selected flow rate of ozonated water having the second concentration.

6. A method of supplying ozonated water to more than one process tool, comprising:

providing an ozonated water control unit comprising:

an ozonated water input port for receiving ozonated water having a first concentration from an ozonated water generator;

a water input port for receiving water from a source;

an ozonated water output port in fluid communication with the ozonated water input port and the water input port; and a valve for controlling a flow rate of water in the water input port to produce ozonated water having a second concentration in the output port, in cooperation with a flow rate of ozonated water in the ozonated water input port, and supplying ozonated water having the second concentration from the output port to a first process tool, while supplying ozonated water from the ozonated water generator to a second process tool.

7. The method of claim 6, wherein the second ozone concentration can be in a range of 0 to 100% of the first concentration.

8. The method of claim 6 wherein supplying ozonated water from the ozonated water generator to a second process tool comprises providing a second ozonated water control unit comprising:

an ozonated water input port for receiving ozonated water having the first concentration from the ozonated water generator;

a water input port for receiving water from the source;

an ozonated water output line in fluid communication with the ozonated water input port and the water input port; and a valve for controlling a flow rate of water in the water input port to produce ozonated water having a third concentration in the output port, in cooperation with a flow rate of ozonated water in the ozonated water input port, and supplying ozonated water having the third concentration from the output port to the second process tool.

9. A method for supplying ozonated water to more than one process tool, comprising:

receiving ozonated water having a first concentration from an ozonated water generator for a first process tool;

receiving ozonated water having the first concentration from the ozonated water generator for a second process tool;

mixing water from a source with the ozonated water received from the ozonated water generator for the second process tool to produce a second concentration;

supplying the ozonated water having the first concentration to the first process tool; and supplying the ozonated water having the second concentration to the second process tool.

10. A method for supplying ozonated water to more than one process tool, comprising:

receiving ozonated water having a first concentration from an ozonated water generator;

receiving water from a source;

controlling the mixing of the received ozonated water and the received water from the source to produce ozonated water having a second concentration; and supplying ozonated water having the second concentration to a first process tool, while supplying ozonated water from the ozonated water generator to a second process tool.

* * * * *